(12) United States Patent
Smith et al.

(10) Patent No.: US 8,774,977 B2
(45) Date of Patent: Jul. 8, 2014

(54) MULTIPHASE ELECTRICAL POWER CONSTRUCTION AND ASSIGNMENT AT MINIMAL LOSS

(75) Inventors: Lynn Smith, San Mateo, CA (US); Stacey Reineccius, San Francisco, CA (US)

(73) Assignee: STEM, Inc., Milbrae, CA (US)

( * ) Notice: Subject to any disclaimer, the term of this patent is extended or adjusted under 35 U.S.C. 154(b) by 269 days.

(21) Appl. No.: 13/339,848

(22) Filed: Dec. 29, 2011
(Under 37 CFR 1.47)

(65) Prior Publication Data

US 2013/0030588 A1    Jan. 31, 2013

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01R 23/00 | (2006.01) |
| G01R 23/12 | (2006.01) |
| G01R 25/00 | (2006.01) |
| G05F 5/00 | (2006.01) |
| H02J 3/26 | (2006.01) |

(52) U.S. Cl.
CPC . *G05F 5/00* (2013.01); *Y02E 40/50* (2013.01); *H02J 3/26* (2013.01)
USPC ........... 700/292; 700/287; 700/295; 700/297; 324/76.52; 324/76.77

(58) Field of Classification Search
USPC ............... 700/287, 292, 295, 297; 324/76.52, 324/76.77
See application file for complete search history.

(56) References Cited

U.S. PATENT DOCUMENTS

| 3,487,289 A | 12/1969 | McMurray |
| 4,121,147 A | 10/1978 | Becker et al. |
(Continued)

FOREIGN PATENT DOCUMENTS

| EP | 2101403 A2 | 9/2009 |
| EP | 2 204 658 A1 | 7/2010 |
(Continued)

OTHER PUBLICATIONS

International Search Report, PCT/US2012/071709 dated Jun. 12, 2013.

(Continued)

*Primary Examiner* — Ronald Hartman, Jr.
(74) *Attorney, Agent, or Firm* — Patterson & Sheridan, LLP

(57) ABSTRACT

In a multiphase electrical power construction and assignment, a processor: determines a phase and voltage configuration for bi-directional power device pairs; determines a given bi-directional power device pair is to be coupled to a given phase connection based on the configuration; determines whether the given bi-directional power devices in the given bi-directional power device pair are to be coupled to each other; confirms that the given bi-directional power device pair is not coupled to any of the plurality of phase connections; couples the given bi-directional power device pair to the given phase connections, where power signals of the given bi-directional power device pair are synchronized with a power signal of the given phase connection; and in response to determining that the given bi-directional power devices are to be coupled to each other, couples each of the bi-directional power devices to a short bus.

18 Claims, 5 Drawing Sheets

(56) References Cited

U.S. PATENT DOCUMENTS

| | | | | |
|---|---|---|---|---|
| 4,287,465 | A | 9/1981 | Godard et al. | |
| 4,399,396 | A | 8/1983 | Hase | |
| 4,559,590 | A | 12/1985 | Davidson | |
| 4,752,697 | A | 6/1988 | Lyons et al. | |
| 4,847,745 | A | 7/1989 | Shekhawat et al. | |
| 4,996,637 | A | 2/1991 | Piechnick | |
| 5,262,931 | A | 11/1993 | Vingsbo | |
| 5,274,571 | A | 12/1993 | Hesse et al. | |
| 5,369,353 | A * | 11/1994 | Erdman | 323/207 |
| 5,510,700 | A | 4/1996 | Pomatto | |
| 5,594,318 | A | 1/1997 | Nor et al. | |
| 5,595,506 | A | 1/1997 | Robinson et al. | |
| 5,620,337 | A | 4/1997 | Pruehs | |
| 5,909,367 | A * | 6/1999 | Change | 363/163 |
| 6,015,314 | A | 1/2000 | Benfante | |
| 6,018,203 | A | 1/2000 | David et al. | |
| 6,059,605 | A | 5/2000 | Robinson et al. | |
| 6,160,722 | A | 12/2000 | Thommes et al. | |
| 6,172,480 | B1 | 1/2001 | Vandelac | |
| 6,200,158 | B1 | 3/2001 | Robinson | |
| 6,268,715 | B1 | 7/2001 | Oglesbee et al. | |
| 6,301,132 | B1 | 10/2001 | Vandelac | |
| 6,310,789 | B1 | 10/2001 | Nebrigic et al. | |
| 6,388,421 | B2 | 5/2002 | Abe | |
| 6,404,655 | B1 | 6/2002 | Welches | |
| 6,420,801 | B1 | 7/2002 | Seefeldt | |
| 6,424,119 | B1 | 7/2002 | Nelson et al. | |
| 6,429,625 | B1 | 8/2002 | LeFevre et al. | |
| 6,522,031 | B2 | 2/2003 | Provanzana et al. | |
| 6,587,362 | B1 | 7/2003 | Vithayathil | |
| 6,606,552 | B2 | 8/2003 | Haimerl et al. | |
| 6,639,383 | B2 | 10/2003 | Nelson et al. | |
| 6,750,685 | B1 | 6/2004 | Guerrero Mercado | |
| 7,019,666 | B2 | 3/2006 | Tootoonian Mashhad et al. | |
| 7,031,859 | B2 | 4/2006 | Piesinger | |
| 7,157,810 | B2 | 1/2007 | Kanouda et al. | |
| 7,199,527 | B2 * | 4/2007 | Holman et al. | 313/511 |
| 7,248,490 | B2 | 7/2007 | Olsen et al. | |
| 7,262,694 | B2 | 8/2007 | Olsen et al. | |
| 7,324,361 | B2 * | 1/2008 | Siri | 363/95 |
| 7,385,373 | B2 | 6/2008 | Doruk et al. | |
| 7,456,519 | B2 | 11/2008 | Takeda et al. | |
| 7,676,334 | B2 | 3/2010 | Matsuura et al. | |
| 7,747,739 | B2 | 6/2010 | Bridges et al. | |
| 7,752,145 | B2 | 7/2010 | Kelty | |
| 7,804,183 | B2 | 9/2010 | Arinaga | |
| 7,933,695 | B2 | 4/2011 | Yamaguchi | |
| 8,053,921 | B2 | 11/2011 | Ichikawa | |
| 8,125,183 | B2 | 2/2012 | Katsunaga | |
| 8,149,114 | B2 | 4/2012 | Hanft | |
| 8,183,995 | B2 | 5/2012 | Wang et al. | |
| 2002/0019758 | A1 | 2/2002 | Scarpelli | |
| 2002/0171436 | A1 | 11/2002 | Russell | |
| 2002/0173902 | A1 | 11/2002 | Haimerl et al. | |
| 2002/0190525 | A1 | 12/2002 | Worden et al. | |
| 2003/0007369 | A1 | 1/2003 | Gilbreth et al. | |
| 2003/0057919 | A1 | 3/2003 | Yang | |
| 2004/0062059 | A1 | 4/2004 | Cheng et al. | |
| 2004/0262996 | A1 | 12/2004 | Olsen et al. | |
| 2004/0263116 | A1 | 12/2004 | Doruk et al. | |
| 2005/0125243 | A1 * | 6/2005 | Villalobos | 705/1 |
| 2005/0237844 | A1 * | 10/2005 | Hyde | 365/228 |
| 2006/0023478 | A1 * | 2/2006 | Takeda et al. | 363/97 |
| 2007/0005195 | A1 | 1/2007 | Pasquale et al. | |
| 2007/0117436 | A1 | 5/2007 | Davis | |
| 2007/0145952 | A1 | 6/2007 | Arcena | |
| 2007/0159866 | A1 * | 7/2007 | Siri | 363/95 |
| 2007/0200433 | A1 | 8/2007 | Kelty | |
| 2008/0012667 | A1 | 1/2008 | Colsch et al. | |
| 2008/0183408 | A1 | 7/2008 | Matsuura et al. | |
| 2008/0272934 | A1 | 11/2008 | Wang et al. | |
| 2009/0102424 | A1 | 4/2009 | Tien et al. | |
| 2009/0146423 | A1 | 6/2009 | Arinaga | |
| 2009/0160259 | A1 * | 6/2009 | Naiknaware et al. | 307/82 |
| 2009/0288896 | A1 | 11/2009 | Ichikawa | |
| 2010/0034003 | A1 * | 2/2010 | Rozman et al. | 363/171 |
| 2010/0082464 | A1 | 4/2010 | Keefe | |
| 2010/0114387 | A1 | 5/2010 | Chassin | |
| 2011/0221195 | A1 * | 9/2011 | Raju | 290/44 |
| 2012/0069619 | A1 * | 3/2012 | Badger et al. | 363/141 |
| 2012/0257429 | A1 * | 10/2012 | Dong et al. | 363/127 |
| 2012/0319748 | A1 * | 12/2012 | Luo | 327/158 |
| 2013/0030588 | A1 * | 1/2013 | Smith et al. | 700/295 |
| 2013/0039104 | A1 * | 2/2013 | Sharma | 363/123 |
| 2013/0147201 | A1 * | 6/2013 | Roesner et al. | 290/55 |
| 2013/0334817 | A1 * | 12/2013 | Scholte-Wassink | 290/44 |
| 2014/0030089 | A1 * | 1/2014 | Wickstrom | 416/1 |

FOREIGN PATENT DOCUMENTS

| | | |
|---|---|---|
| EP | 2 475 059 A1 | 7/2012 |
| JP | 2002-305842 A | 10/2002 |
| JP | 2006-141093 A | 6/2006 |
| JP | 2006-338889 A | 12/2006 |
| JP | 2008-141918 A | 6/2008 |
| JP | 2008-178215 A | 7/2008 |
| TW | 200849770 A | 12/2008 |

OTHER PUBLICATIONS

Cha et al. "A New Soft Switching Direct Converter for Residential Fuel Cell Power System", IAS 2004. 2:1172-1177.

Choe et al. "A Parallel Operation Algorithm with Power-Sharing Technique for FC Generation Systems". 2009.725-731.

Chenier, Glen. Reversal of Fortune. Electronic, Design, Strategy, News. 2009. p. 62.

M.A. Kai, "Lessons Learned from the Texas Synchrophasor Network", IEEE-PES Innovative Smart Grid Technologies Conference, Berlin, Oct. 14-17, 2012.

\* cited by examiner

Example Phase Assignment Mapping. 6 slot backplane assumed.

| Net Output | Inverter 1 (odd) | | Inverter 2 (even) | | Inverter 3 (odd) | | Inverter 4 (even) | | Inverter 5 (odd) | | Inverter 6 (even) | | NOTE: |
|---|---|---|---|---|---|---|---|---|---|---|---|---|---|
| | AC-1(L) | AC-2(H) | AC-1(L) | AC-2(H) | AC-1(L) | AC-2(H) | AC-1(L) | AC-2(H) | AC-1(L) | AC-2(H) | AC-1(L) | AC-2(H) | |
| 110V | Neutral | Phase 1-3 | | | | | | | | | | | No slot dependency |
| 120V | Neutral | Phase 1-3 | | | | | | | | | | | No slot dependency |
| 240V Single | Neutral | ShortBus | ShortBus | Phase 1-3 | | | | | | | | | See phasing requirement - Inverter two at 180° from Inverter 1 |
| 240V Split | Neutral | Phase 1 | Phase 2 | Neutral | | | | | | | | | Hots on phase 1 & 2, 180 degree phase offset |
| 277V | Neutral | ShortBus | ShortBus | Phase 1-3 | | | | | | | | | Voltage set at 138.5V nominal on each inverter. |
| 208V 3 wire, 2 Phase | Neutral | Phase 1 | Phase 2 | Neutral | | | | | | | | | Each inverter is 120-vac, 120 degree phase offset in ascending order (Inverter 1 = 0 degree, Inverter 2=120 degree) |
| 208V Wye 3 wire, 3 Phase | Phase 2 | Phase 1 | Phase 2 | Phase 3 | Phase 1 | Phase 3 | | | | | | | Each inverter is 120-vac, 120 degree phase offset in ascending order (Inverter 1 = 0 degree, Inverter 2=120 degree, Inverter 3 = 240 degree) |
| 208V Wye 4 wire, 3 Phase | Neutral | Phase 1 | Phase 2 | Neutral | Neutral | Phase 3 | | | | | | | Each inverter is 120-vac, 120 degree phase offset in ascending order (Inverter 1 = 0 degree, Inverter 2=120 degree, Inverter 3 = 240 degree) |
| 240V 4 Wire, 3Phase, Delta | Phase 3 | ShortBus | Shortbus | Phase 1 | Phase 1 | Shortbus | Shortbus | Phase 2 | Phase 2 | Shortbus | Shortbus | Phase 3 | NEUTRAL here is used as tap for 120V and to provide 208V between Inverter 3 and Inverter 5. Each inverter is 120-vac, 120 degree phase offset in ascending order (Inverter 1 = 0 degree, Inverter 2=120 degree, Inverter 3 = 240 degree) |
| 240V Delta | Phase 3 | Shortbus | Shortbus | Phase 1 | Phase 1 | Shortbus | Shortbus | Phase 2 | Phase 2 | Shortbus | Shortbus | Phase 3 | Each inverter is 120-vac, 120 degree phase offset in ascending order (Inverter 1,2 = 0 degree, Inverter 3,4=120 degree, Inverter 5,6 = 240 degree) |
| 480V Wye | Neutral | ShortBus | ShortBus | Phase 1 | Neutral | ShortBus | Shortbus | Phase 2 | Neutral | ShortBus | Shortbus | Phase 3 | 3 sets of 277V one to each leg. 120 degree phase offset in ascending order |

FIG. 4

MULTIPHASE ELECTRICAL POWER CONSTRUCTION AND ASSIGNMENT AT MINIMAL LOSS

CROSS-REFERENCE TO RELATED APPLICATIONS

The present application is related to co-pending U.S. Patent Application Ser. No. 13/339,821, filed on Dec. 29, 2011, entitled "Multiphase Electrical Power Assignment at Minimal Loss".

BACKGROUND OF THE INVENTION

Traditional interconnections between energy sources or sinks (load) for use or charging in AC power systems utilize fixed wiring connection assignments taken from a multiphase generation source. Typically these connection assignments are taken through a distribution panel on a premise (i.e., business, home, or other usage location), where each phase is broken out and subsidiary wiring circuits are run utilizing one or more source phases. As a result of this break out and lack of visibility and means of allocating loads or sources, the net load/source profile in a given premise installation is often unbalanced with an unequal amount of load on each of the phases. Having unbalanced loads results in significant reductions in generator efficiency as well as increased losses throughout an AC transmission and distribution system. Further, if an onsite generator, especially a variable output generator such as solar or wind, is connected to the AC system, its outputs tend to be balanced from the generator but is then attached to an unbalanced loading situation in its premise. This results in the unbalanced loading on each phase of supplied power, leading to significant inefficiencies.

This variety of possible interconnection configurations has typically been met by custom designing and tuning the power electronics to match a target or desired configuration. This need for customized design results in a variety of inefficiencies in that it requires multiple product designs, lower volumes of manufacture per product and greater complexity in the design of the components, and does not allow for dynamic reallocation of resources due to varying load conditions that unbalance the phases at times during normal use.

BRIEF SUMMARY OF THE INVENTION

According to one embodiment of the present invention, a method for multiphase electrical power construction and assignment comprises: (a) determining a phase and voltage configuration for a plurality of bi-directional power device pairs by a processor; (b) determining by the processor at least one of a given bi-directional power device pair is to be coupled to at least one given phase connection of a plurality of phase connections based on the configuration; (c) determining by the processor whether the given bi-directional power devices in the given bi-directional power device pair are to be coupled to each other; (d) confirming by the processor that the given bi-directional power device pair is not coupled to any of the plurality of phase connections; (e) coupling the given bi-directional power device pair to the at least one given phase connections by the processor, wherein power signals of the given bi-directional power device pair are synchronized with a power signal of the at least one given phase connection; and (f) in response to determining that the given bi-directional power devices are to be coupled to each other, coupling each of the bi-directional power devices to a short bus by the processor.

In one aspect of the present invention, the given bi-directional power device pair comprises a given AC power source/load device pair, wherein the determining (b) comprises: (b1) determining by the processor that at least one of the given AC power source/load device pair is to be connected to at least one target phase; (b2) determining by the processor whether the given AC source/load devices in the given AC power source/load device pair are to be coupled to each other; and (b3) placing the given AC power source/load device pair into an idle mode by the processor.

In one aspect of the present invention, a plurality of switches is coupled between the given AC power source/load device pair and the plurality of phase connections, wherein the confirming (d), the coupling (e), and the coupling (f) comprise: (d1) determining by the processor whether the given AC power source/load device pair is in a connected state; (d2) in response to determining that the given AC power source/load device pair is in the connected state, issuing a command by the processor to place each of the plurality of switches in an open state; (d3) confirming by the processor that each of the plurality of switches is in the open state; (e1) in response to confirming that each of the plurality of switches is in the open state, issuing commands to the given AC power source/load device pair by the processor so that power signals of the given AC source/load device pair will be synchronized with the at least one target phase; (e2) closing at least one given switch of the plurality of switches corresponding to the at least one target phase by the processor; and (f1) in response to determining that that the AC power source/load devices are to be coupled to each other, closing second given switches of the plurality of switches corresponding to the short bus by the processor.

In one aspect of the present invention, the issuing (e1), the closing (e2), and the closing (f1) comprise: (e1i) determining by the processor a frequency and zero crossing point of the at least one target phase; (e1ii) issuing timing and control commands to the given AC power source/load device pair by the processor so that frequencies of the power signals of the given AC source/load device pair will be synchronized with the frequencies of the at least one target phase; (e2i) issuing a command by the processor to first fixed logics coupled to the plurality of switches to close the at least one given switch corresponding to the at least one target phase at the zero crossing point of the at least one target phase; and (f1i) issuing a command to second fixed logics coupled to the plurality of switches to close the second given switches corresponding to the short bus by the processor.

In one aspect of the present invention, the method further comprises: (g) confirming by the processor that each of the plurality of switches are in an appropriate state; and (h) in response to confirming that each of the plurality of switches are in the appropriate state by the processor, instructing the given AC power source/load device pair to begin providing or drawing power.

In one aspect of the present invention, the coupling (e) further comprises: (e3) in response to confirming that one of the plurality of switches is not in the open state, issuing a fault by the processor.

System and computer program products corresponding to the above-summarized methods are also described and claimed herein.

BRIEF DESCRIPTION OF THE SEVERAL VIEWS OF THE FIGURES

FIG. 4 illustrates example configurations of the system for multiphase electrical power construction and assignment according to the present invention.

DETAILED DESCRIPTION OF THE INVENTION

Figure 1:
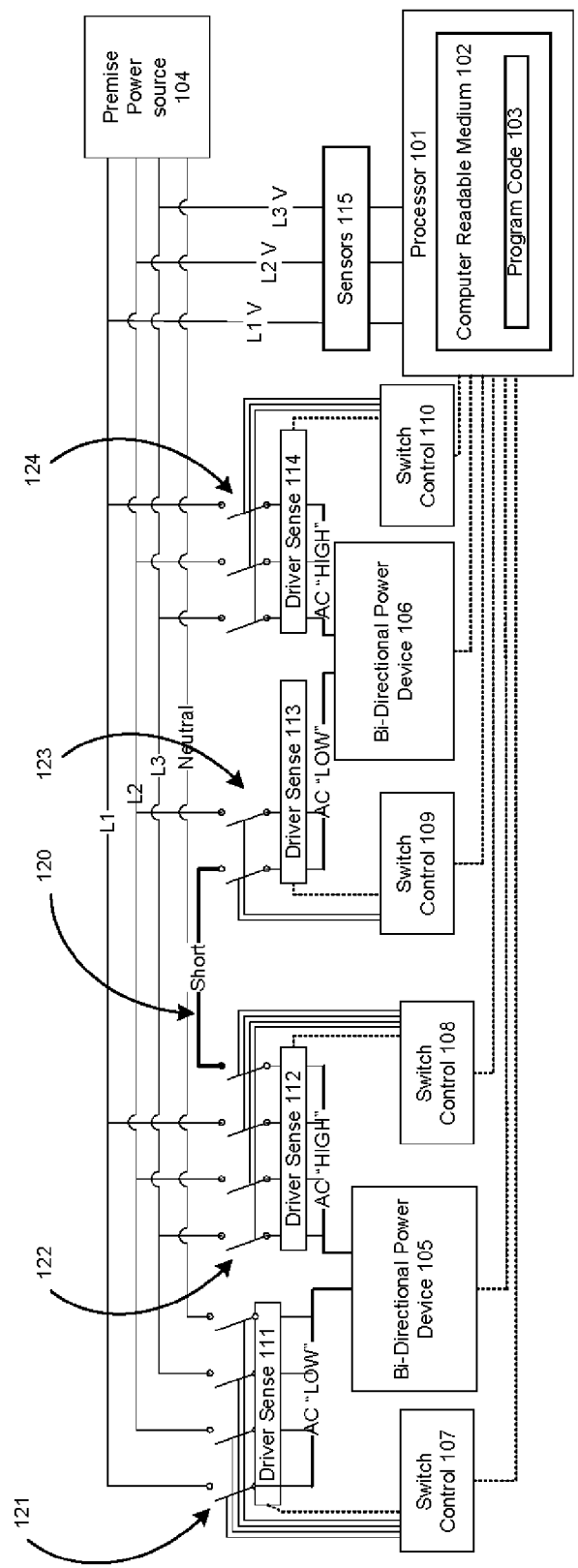
FIG. 1 illustrates an embodiment of a system for multiphase electrical power construction and assignment according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of a system for multiphase electrical power construction and assignment according to the present invention. The system comprises a processor 101 operationally coupled to a computer readable medium 102. The computer readable medium 102 stores computer readable program code 103 for implementing the method of the present invention. More specifically, the processor 101 controls the operations of bi-directional power devices 105-106 and switch control logics 107-110. The system further comprises a premise power source 104 for providing multi-phase electrical power from the "grid". A plurality of bi-directional power device pairs 105-106 reside throughout the premises and each pair may be connected via local power lines to one of the phases of the premise power source 104. In this embodiment, each bi-direction power device 105-106 can either draw power from the connections or provide power to the connections. Sensors 115 coupled to the circuit connections at the premise power source 104 measure the voltage and current on the connections. Each connection provides power on one of a plurality of phases of power. FIG. 1 illustrates three phases of power (L1, L2, and L3), however, any number of phases may be used without departing from the spirit and scope of the present invention. In this embodiment, there is one set of sensors per phase of power, and measurements by the sensors 115 are accessible to the processor 101. Although the sensors 115 and the processor 101 are illustrated here as separate components, the sensors 115 may be incorporated with the processor 101 in the same component. Each bi-directional power device 105-106 comprise "high" and "low" connections, and each high and low connection is able to couple to a specific phase connection via switches 121-124. The switches 122-124 are also able to connect the bi-directional power devices 105-106 to each other via a short bus 120, so that the bi-directional power devices 105-106 may operate in series. The switches 121-124 are controlled by corresponding switch control logics 107-

110, which are able to determine the status of each switch via corresponding driver sense circuits 111-114. Although this embodiment illustrates both bi-directional power sources 105-106 being controlled by the same processor 101, the bi-directional power sources 105-106 may be controlled by separate processors without departing from the spirit and scope of the present invention.

Figure 2:
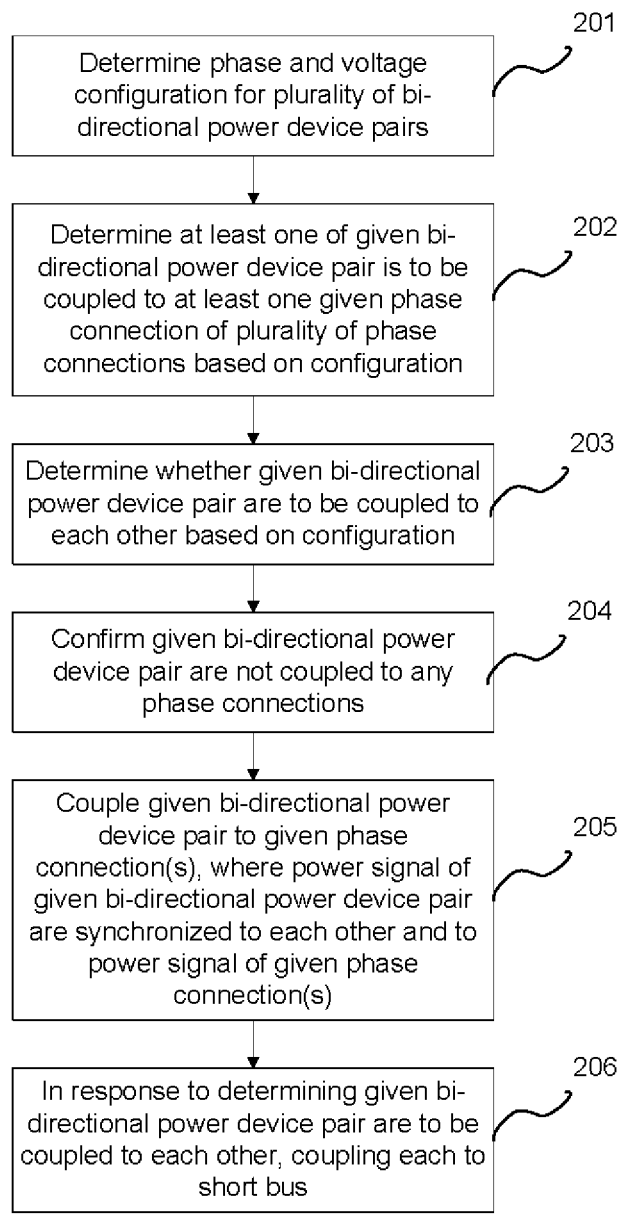
FIG. 2 is a flowchart illustrating an embodiment of a method for multiphase electrical power construction and assignment according to the present invention.

FIG. 2 is a flowchart illustrating an embodiment of a method for multiphase electrical power construction and assignment according to the present invention. In this embodiment, the processor 101 determines the phase and voltage configuration for the plurality of bi-directional power device pairs 105-106 (201). The particular configuration depends upon the desired net output voltage and phase and the number of bi-directional power devices on a backplane, as described further below. Based on the configuration, the processor 101 determines that at least one of a given bi-directional power device pair 105-106 is to be coupled to at least one given phase connection of the plurality of phase connections (202). the processor 101 also determines whether the given bi-directional power device pair 105-106 are to be coupled to each other based on the configuration (205). The processor 101 then confirms that the given bi-directional power device pair 105-106 is not coupled to any of the plurality of phase connections (203). In this embodiment, the processor 101 determines the status of the switches 121-124 from the driver sense circuits 111-114 via the switch control logics 107-110. Prior to performing any connections, the processor 101 determines that the switches 121-124 are not coupled in order to avoid overlapping phase connections or state changes at other than the instructed time. After determining that the switches 121-124 are not coupled, the processor 101 couples the given bi-directional power device pair 105-106 to the given phase connection(s) (204). In this embodiment, the processor 101 sends a command to the appropriate switch control logic(s) 107-110 to close the switch(es) corresponding to the given phase connection(s). These connections are performed such that the power signals of the given bi-directional power device pair 105-106 are synchronized with each other and with the power signal of the given phase connection(s). In response to determining that the given bi-directional power device pair 105-106 are to be coupled to each other (per 202), the processor 101 couples each bi-directional power device 105-106 in the pair to a short bus 120 (205). In this embodiment, the processor 101 sends a command to the switch control logics 108 and 109 to close the switches 122 and 124 corresponding to the short bus 120.

Figure 3:
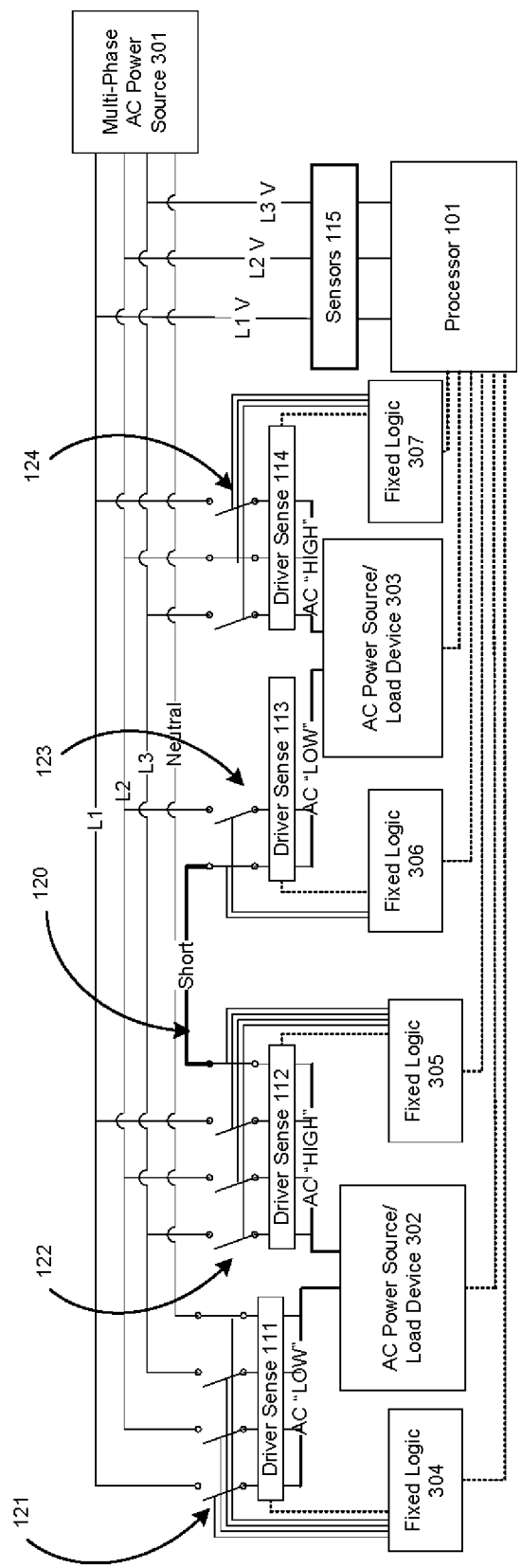
FIG. 3 illustrates in more detail the embodiment of the system for multiphase electrical power construction and assignment according to the present invention.

FIG. 3 illustrates in more detail the embodiment of the system for multiphase electrical power construction and assignment according to the present invention. In this embodiment, the premise power source 104 comprises a multi-phase AC power source 301, such as the power grid. The bi-directional power devices 105-106 comprise single phase, grid connectable, AC power source/load devices 302-303. The processor 101 is coupled to the sensors 115 and may comprise a microcontroller, a digital signal processor (DSP), or another appropriate processor type. The processor 101 may comprise a plurality of analog to digital conversion inputs, clocks, internal memory and other computational elements. The AC power source/load devices 302-303 may be controlled by the same processor 101, as illustrated, or by separate processors. The switches 121-124 comprise relay circuits, which can connect the "high" or "low" output of each AC power source/load device 302-303 to one of the phase connections (L1, L2, L3), and can connect each AC power source/load device 302-303 to the short bus 120.

One set of sensors 115 are coupled to each phase connection, where the sensors 115 are measuring the voltage and current on each phase connection. The processor 101 controls the operation of the AC power source/load devices 302-303 via control signals. The switch control logics 107-110 comprises fixed logic devices 304-307 which receive instructions from the processor 101 to close or open their corresponding switches 121-124. The driver sense circuits 111-114 measure the actual states of the switches 121-124 and sends the states to the processor 101 via the fixed logics 304-307. This allows the processor 101 to validate the actual states of the switches 121-124 and to compare the actual states with the intended states. FIG. 1 illustrates the system in a disconnected mode, i.e., all switches open. FIG. 3 illustrates the system with the low output of the AC power source/load device 302 connected to neutral, the high output of the AC power source/load device 303 connected to a target phase L2, and both AC power source/load device 302-303 connected to the short bus 120. All other switches are open.

FIG. 4 illustrates example configurations of the system for multiphase electrical power construction and assignment according to the present invention. FIG. 4 illustrates the phase assignment mapping for six AC power source/load devices on a backplane. As illustrated, different net outputs can be accomplishes through various combinations of connections of each pair of AC power source/load devices. Thus, for this example, the connections shown in FIG. 3 would result in a 208, 240, or 277 VAC out between neutral and phase 2 of a 3-phase system. The concepts illustrated in FIG. 4 may be expanded to any number of AC source/load devices and any number of phases without departing from the spirit and scope of the present invention.

Figure 5:
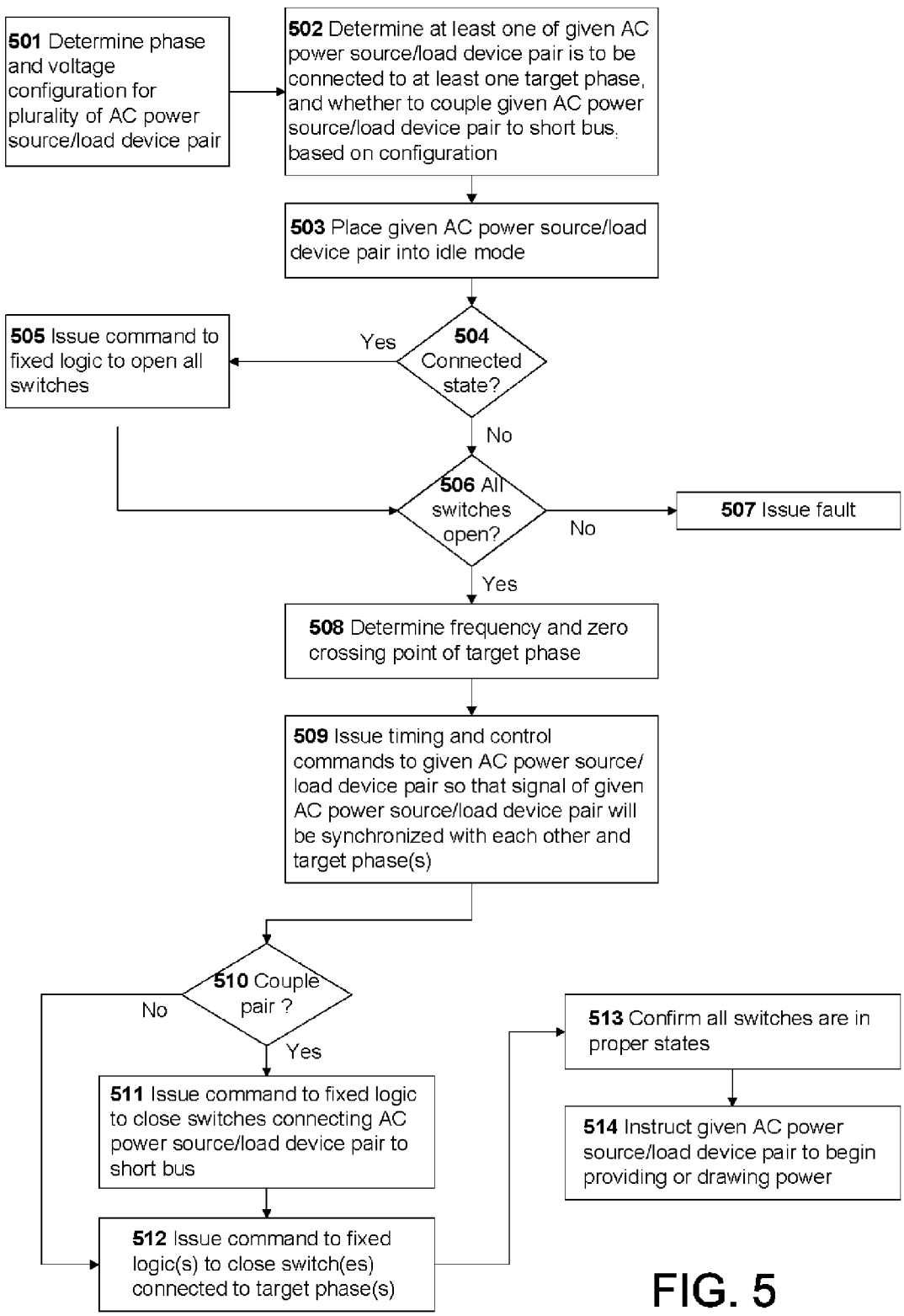
FIG. 5 is a flowchart illustrating in more detail the embodiment of the method for multiphase electrical power construction and assignment according to the present invention.

FIG. 5 is a flowchart illustrating in more detail the embodiment of the method for multiphase electrical power construction and assignment according to the present invention. Referring to FIGS. 3 and 5, the processor 101 determines the phase and voltage configuration for the plurality of AC power source/load device pairs (501). Based on the configuration, the processor 101 determines that at least one of a given AC power source/load device pair 302-303 is to be connected to at least one target phase (502). The processor 101 further determines whether the given AC power source/load device pair 302-303 is to be coupled to the short bus 120. For FIG. 3, the processor 101 determines that the high output of the AC power source/load device 303 is to be connected to target phase L2, that the low output of the AC power source/load device 302 is to be connected to neutral, and that the AC power source/load devices 302-303 are to be coupled to the short bus 120. The processor 101 then places the given AC power source/load device pair 302-303 into an idle mode (503). In the idle mode, there is zero voltage difference between each AC power source/load device 302-303 and the AC power source 301, which prevents current flow. The processor 101 is also continuously tracking the frequencies of the AC power source 301 in order to maintain synchronization, as described further below.

The processor 101 next determines the current state of each AC power source/load device 302-303 (504). If the given AC power source/load device pair 302-303 is determined to be in a disconnected state, i.e., not connected to the AC power source 301, the processor 101 determines whether each switch 121-124 is open (506). In this embodiment, the processor 101 makes this determination from the states of the switches 121-124 as received from the driver sense circuits 111-114. The driver sense circuits 111-114 compare the voltage across each switch with the grid voltage to determine whether the grid voltage is seen across the switch. If any of the switches 121-124 are in a closed state, then a fault is issued (507).

If either AC power source/load device 302-303 is determined to be in a connected state, then the processor 101 issues a command to the fixed logics 304-307 to open all of the switches 121-124 (505). The processor 101 then attempts to confirm that each of the switches 121-124 is in an open state (506). If any of the switches 121-124 are still in a closed state, then a fault is issued (507).

When the processor 101 confirms that each of the switches 121-124 is in an open state, the processor 101 uses the inputs from the sensors 115 to determine the frequency and zero crossing point of the target phase L2 (508). The processor 101 issues timing and control commands to each AC power source/load device 302-303 so that the AC power source/load device 303 and the target phase L2 will be synchronized once connected and the AC power source/load devices 302-303 will be synchronized with each other (509). The timing and control commands allow the AC power source/load device 303 to synchronize to the same frequency and voltage as the target phase L2. Stress on a switch may be reduced by closing the switch at the zero crossing point of the target phase. The processor 101 then issues a command to the fixed logic 307 to close the switch 124 connected to the target phase L2 and issues a command to the fixed logic 304 to close the switch 111 connected to neutral (512). Since the AC power source/load devices 302-303 were determined to be connected to the short bus 120 (per 502), the processor 101 also issues a command to the fixed logics 305-306 to close the switches 122-123 connected to the short bus 120 (511). In this embodiment, the fixed logics 304-307 ensure that for each AC power source/load device 302-303, only one switch at a time can be closed on a phase connection and that adequate delay is present to ensure that all switches connected to a phase connection are open before a switch is closed. The processor 101 then confirms that all of the switches 121-124 are in their proper states (513) via the states measured by the driver sense circuits 111-114. Once the processor 101 makes this confirmation, the processor 101 instructs the AC power source/load device pair 302-303 to begin providing or drawing power (514).

A method and system for multiphase electrical power construction and assignment have been disclosed. The embodiments of the present invention provide for the flexible interconnection of bi-directional power devices to obtain a variety of output voltages and phase configurations. The embodiments of the present invention provide the ability to use a single design to meet a variety of connection requirements, which lowers potential manufacturing costs. The embodiments of the present invention further provide flexibility in installation by allowing software controlled configuration of voltages, eliminating costs and complexity during system integration and installation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:
1. A method for multiphase electrical power construction and assignment comprises:

(a) determining a phase and voltage configuration for a plurality of bi-directional power device pairs by a processor;
(b) determining by the processor at least one of a given bi-directional power device pair is to be coupled to at least one given phase connection of a plurality of phase connections based on the configuration;
(c) determining by the processor whether the given bi-directional power devices in the given bi-directional power device pair are to be coupled to each other;
(d) confirming by the processor that the given bi-directional power device pair is not coupled to any of the plurality of phase connections;
(e) coupling the given bi-directional power device pair to the at least one given phase connections by the processor, wherein power signals of the given bi-directional power device pair are synchronized with a power signal of the at least one given phase connection; and
(f) in response to determining that the given bi-directional power devices are to be coupled to each other, coupling each of the bi-directional power devices to a short bus by the processor.

2. The method of claim 1, wherein the given bi-directional power device pair comprises a given AC power source/load device pair, wherein the determining (b) comprises:
(b1) determining by the processor that at least one of the given AC power source/load device pair is to be connected to at least one target phase;
(b2) determining by the processor whether the given AC source/load devices in the given AC power source/load device pair are to be coupled to each other; and
(b3) placing the given AC power source/load device pair into an idle mode by the processor.

3. The method of claim 2, wherein a plurality of switches is coupled between the given AC power source/load device pair and the plurality of phase connections, wherein the confirming (d), the coupling (e), and the coupling (f) comprise:
(d1) determining by the processor whether the given AC power source/load device pair is in a connected state;
(d2) in response to determining that the given AC power source/load device pair is in the connected state, issuing a command by the processor to place each of the plurality of switches in an open state;
(d3) confirming by the processor that each of the plurality of switches is in the open state;
(e1) in response to confirming that each of the plurality of switches is in the open state, issuing commands to the given AC power source/load device pair by the processor so that power signals of the given AC source/load device pair will be synchronized with the at least one target phase;
(e2) closing at least one given switch of the plurality of switches corresponding to the at least one target phase by the processor; and
(f1) in response to determining that the AC power source/load devices are to be coupled to each other, closing second given switches of the plurality of switches corresponding to the short bus by the processor.

4. The method of claim 3, wherein the issuing (e1), the closing (e2), and the closing (f1) comprise:
(e1i) determining by the processor a frequency and zero crossing point of the at least one target phase;
(e1ii) issuing timing and control commands to the given AC power source/load device pair by the processor so that frequencies of the power signals of the given AC source/load device pair will be synchronized with the frequencies of the at least one target phase;

(e2i) issuing a command by the processor to first fixed logics coupled to the plurality of switches to close the at least one given switch corresponding to the at least one target phase at the zero crossing point of the at least one target phase; and (f1i) issuing a command to second fixed logics coupled to the plurality of switches to close the second given switches corresponding to the short bus by the processor.

5. The method of claim 3, further comprising:
(g) confirming by the processor that each of the plurality of switches are in an appropriate state; and
(h) in response to confirming that each of the plurality of switches are in the appropriate state by the processor, instructing the given AC power source/load device pair to begin providing or drawing power.

6. The method of claim 3, wherein the coupling (e) further comprises:
(e3) in response to confirming that one of the plurality of switches is not in the open state, issuing a fault by the processor.

7. A computer program product for multiphase electrical power construction and assignment, the computer program product comprising:
a non-transitory computer readable medium having computer readable program code embodied therewith, the computer readable program code configured to:
determine a phase and voltage configuration for a plurality of bi-directional power device pairs;
determine at least one of a given bi-directional power device pair is to be coupled to at least one given phase connection of a plurality of phase connections based on the configuration;
determine whether the given bi-directional power devices in the given bi-directional power device pair are to be coupled to each other;
confirm that the given bi-directional power device pair is not coupled to any of the plurality of phase connections;
couple the given bi-directional power device pair to the at least one given phase connections, wherein power signals of the given bi-directional power device pair are synchronized with a power signal of the at least one given phase connection; and
in response to determining that the given bi-directional power devices are to be coupled to each other, couple each of the bi-directional power devices to a short bus.

8. The computer program product of claim 7, wherein the given bi-directional power device pair comprises a given AC power source/load device pair, wherein the computer readable program code configured to determine that the at least one of the given bi-directional power device pair is to be coupled to the at least one given phase connection is further configured to:
determine that at least one of the given AC power source/load device pair is to be connected to at least one target phase;
determine whether the given AC source/load devices in the given AC power source/load device pair are to be coupled to each other; and
place the given AC power source/load device pair into an idle mode.

9. The computer program product of claim 8, wherein a plurality of switches is coupled between the given AC power source/load device pair and the plurality of phase connections, wherein the computer readable program code configured to confirm that the given bi-directional power device pair is not coupled to any of the plurality of phase connections, to couple the given bi-directional power device pair to the at least one given phase connections, and to couple each of the bi-directional power devices to the short bus, are further configured to:
determine whether the given AC power source/load device pair is in a connected state;
in response to determining that the given AC power source/load device pair is in the connected state, issue a command to place each of the plurality of switches in an open state;
confirm that each of the plurality of switches is in the open state;
in response to confirming that each of the plurality of switches is in the open state, issue commands to the given AC power source/load device pair so that power signals of the given AC source/load device pair will be synchronized with the at least one target phase;
close at least one given switch of the plurality of switches corresponding to the at least one target phase; and
in response to determining that that the AC power source/load devices are to be coupled to each other, close second given switches of the plurality of switches corresponding to the short bus.

10. The computer program product of claim 9, wherein the computer readable program code configured to issue commands to the given AC power source/load device pair, to close at least one given switch of the plurality of switches corresponding to the at least one target phase, and to close the second given switches of the plurality of switches corresponding to the short bus, are further configured to:
determine a frequency and zero crossing point of the at least one target phase;
issue timing and control commands to the given AC power source/load device pair so that frequencies of the power signals of the given AC source/load device pair will be synchronized with the frequencies of the at least one target phase;
issue a command to first fixed logics coupled to the plurality of switches to close the at least one given switch corresponding to the at least one target phase at the zero crossing point of the at least one target phase; and
issue a command to second fixed logics coupled to the plurality of switches to close the second given switches corresponding to the short bus.

11. The computer program product of claim 9, wherein the computer readable program code is further configured to:
confirm that each of the plurality of switches are in an appropriate state; and
in response to confirming that each of the plurality of switches are in the appropriate state, instruct the given AC source/load device pair to begin providing or drawing power.

12. The computer program product of claim 9, wherein the computer readable program code configured to couple the given bi-directional power device pair to the at least one given phase connections is further configured to:
in response to confirming that one of the plurality of switches is not in the open state, issue a fault.

13. A system, comprising:
a plurality of power phase connections coupled to a multiphase premise power source;
a plurality of bi-directional power device pairs;
a plurality of switches coupled to the plurality of bi-directional power device pairs and the plurality of power phase connections; and a processor operationally coupled to a computer readable medium having computer readable program code embodied therewith, the computer readable program configured to:
- determine a phase and voltage configuration for the plurality of bi-directional power device pairs;
- determine at least one of a given bi-directional power device pair is to be coupled to at least one given phase connection of the plurality of phase connections based on the configuration;
- determine whether the given bi-directional power devices in the given bi-directional power device pair are to be coupled to each other;
- confirm that the given bi-directional power device pair is not coupled to any of the plurality of phase connections;
- couple the given bi-directional power device pair to the at least one given phase connections, wherein power signals of the given bi-directional power device pair are synchronized with a power signal of the at least one given phase connection; and
- in response to determining that the given bi-directional power devices are to be coupled to each other, couple each of the bi-directional power devices to a short bus.

14. The system of claim 13, wherein the bi-directional power device comprises an AC power source/load device, wherein the computer readable program code configured to determine that the at least one of the given bi-directional power device pair is to be coupled to the at least one given phase connection is further configured to:
- determine that at least one of the given AC power source/load device pair is to be connected to at least one target phase;
- determine whether the given AC source/load devices in the given AC power source/load device pair are to be coupled to each other; and
- place the given AC power source/load device pair into an idle mode.

15. The system of claim 14, wherein the computer readable program code configured to confirm that the given bi-directional power device pair is not coupled to any of the plurality of phase connections, to couple the given bi-directional power device pair to the at least one given phase connections, and to couple each of the bi-directional power devices to the short bus, are further configured to:
- determine whether the given AC power source/load device pair is in a connected state;
- in response to determining that the given AC power source/load device pair is in the connected state, issue a command to place each of the plurality of switches in an open state;
- confirm that each of the plurality of switches is in the open state;
- in response to confirming that each of the plurality of switches is in the open state, issue commands to the given AC power source/load device pair so that power signals of the given AC source/load device pair will be synchronized with the at least one target phase;
- close at least one given switch of the plurality of switches corresponding to the at least one target phase; and
- in response to determining that that the AC power source/load devices are to be coupled to each other, close second given switches of the plurality of switches corresponding to the short bus.

16. The system of claim 15, further comprising a plurality of fixed logics coupled to the plurality of switches and the processor, wherein the computer readable program code configured to issue commands to the given AC power source/load device pair, to close at least one given switch of the plurality of switches corresponding to the at least one target phase, and to close the second given switches of the plurality of switches corresponding to the short bus, are further configured to:
- determine a frequency and zero crossing point of the at least one target phase;
- issue timing and control commands to the given AC power source/load device pair so that frequencies of the power signals of the given AC source/load device pair will be synchronized with the frequencies of the at least one target phase;
- issue a command to first fixed logics coupled to the plurality of switches to close the at least one given switch corresponding to the at least one target phase at the zero crossing point of the at least one target phase; and
- issue a command to second fixed logics coupled to the plurality of switches to close the second given switches corresponding to the short bus.

17. The system of claim 15, wherein the computer readable program code is further configured to:
- confirm that each of the plurality of switches are in an appropriate state; and
- in response to confirming that each of the plurality of switches are in the appropriate state, instruct the AC source/load device pair to begin providing or drawing power.

18. The system of claim 15, wherein the computer readable program code configured to couple the given bi-directional power device pair to the at least one given phase connections is further configured to:
- in response to confirming that one of the plurality of switches is not in the open state, issue a fault.

* * * * *

UNITED STATES PATENT AND TRADEMARK OFFICE
CERTIFICATE OF CORRECTION

PATENT NO.           : 8,774,977 B2                                    Page 1 of 1
APPLICATION NO.      : 13/339848
DATED                : July 8, 2014
INVENTOR(S)          : Smith et al.

It is certified that error appears in the above-identified patent and that said Letters Patent is hereby corrected as shown below:

Title Page, Assignee item (73):

Please delete "Milbrae, CA (US)" and insert --Millbrae, CA (US)-- therefor.

Signed and Sealed this
Eighth Day of September, 2015

Michelle K. Lee
*Director of the United States Patent and Trademark Office*